Nov. 17, 1970   J. W. SHAFFER   3,540,818
PHOTOFLASH LAMP
Filed Aug. 28, 1968
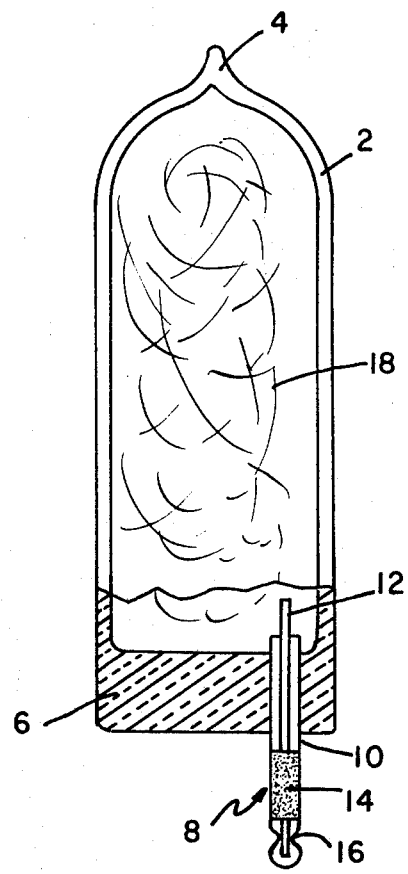
INVENTOR
JOHN W. SHAFFER
BY *Joseph C. Ryan*
ATTORNEY

United States Patent Office 3,540,818
Patented Nov. 17, 1970

3,540,818
PHOTOFLASH LAMP
John W. Shaffer, Williamsport, Pa., assignor to Sylvania Electric Products Inc., a corporation of Delaware
Filed Aug. 28, 1968, Ser. No. 756,026
Int. Cl. F21k 5/02
U.S. Cl. 431—93      8 Claims

ABSTRACT OF THE DISCLOSURE

A percussive-type photoflash lamp in which the fulminating material of the primer thereof includes small quantities of sulfur, either as elemental sulfur or as a sulfide, to improve the shelf life and impact sensitivity retention of red phosphorous-based fulminating materials.

---

This invention relates to the manufacture of photoflash lamps and more particularly those of the percussive type.

Generally speaking a percussive-type photoflash lamp comprises an hermetically sealed, light-transmitting envelope containing a source of actinic light and having a primer secured thereto. More particularly, the percussive-type photoflash lamp may comprise a length of glass tubing constricted to a tip at one end thereof and having a primer sealed therein at the other end thereof. The length of glass tubing which defines the lamp envelope contains a combustible such as shredded zirconium foil and a combustion-supporting gas such as oxygen. The primer may comprise a metal tube and a charge of fulminating material on a wire supported therein. Operation of the lamp is initiated by an impact onto the tube to cause deflagration of the fulminating material up through the tube to ignite the combustible disposed in the lamp envelope.

Fulminating materials for percussive-type photoflash lamps usually comprise a mixture of red phosphorous, potassium chlorate, a metallic fuel such as boron, zirconium, silicon or the like, and a resin binder such as hydroxyethyl cellulose or nitrocellulose. Minor ingredients, such as, for example, an abrasive and a dispersing agent may also be present. Only the red phosphorous, of all the ingredients present, has a very low ignition temperature and provides friction and impact sensitivity in conjunction with the potassium chlorate. As may be expected, the red phosphorous is also the least stable material in the fulminating material. It is rapidly oxidized in the presence of moisture and is thereby converted into phosphoric acid. The rate of this slow degradative oxidation is greatly increased by the presence of traces of either metallic copper or its salts. The acidity resulting from any initial oxidation tends to promote an even more rapid degradation of the remaining phosphorous. However, when the phosphorous is maintained in a dry atmosphere and at an alkaline pH, such degradative oxidation proceeds very slowly if at all.

In view of the foregoing, for critical applications requiring impact ignition sensitivity of phosphorous, the material may be stabilized by the following process: (1) the very fine particles are removed to minimize the reactive surface area per unit weight, (2) the content of oxidation-promoting metals such as copper and iron is reduced, and (3) an alkaline material such as aluminum hydroxide is added to maintain the nonacidic state even after initial oxidation has occurred. It has been found, however, that even this so-called stabilized red phosphorous is measurably deactivated by intermittent exposure to room air over a period of several days; and contact with air is almost inevitable in a manufacturing process.

Heretofore it has been suggested that fulminating materials for percussive-type photoflash lamps are more sensitive to impact when deposited from an aqueous medium than from a nonaqueous medium. This effect has been attributed to deposition of the water soluble potassium chlorate onto the particles of phosphorous during drying. The resulting intimate admixture of phosphorous and potassium chlorate is much more impact sensitive than is a similar weight composition deposited from an organic solvent and consisting of discrete isolated particles of phosphorous and potassium chlorate.

The maximum attainable impact sensitivity is required for fulminating materials for percussive-type photoflash lamps because they must function reliably under conditions of minimal impact commensurate with the construction of a camera. Excessive vibration and jarring are obviously undesirable in a camera mechanism. However, the aqueous slurries of fulminating material that provide the needed sensitivity suffer from problems of phosphorous instability. Upon standing for several days, a typical aqueous fulminating material will change from neutral or slightly alkaline to a very strong acid condition. Chloride ion is found in such deteriorated fulminating material slurries although none is found in fresh material. It is evident that the phosphoric acid present reacts with the potassium chlorate to produce free chloric acid which then decomposes to form chlorides. Chloric acid is a strong oxidizer and would promote further oxidation of the phosphorous. However, long before such acidity develops, a measurable and drastic desensitization toward impact ignition takes place. Lamps made with such deteriorated material either give a poor percentage reliability or fail altogether. Thus the fulminating material slurry must be made up and used while fresh preferably on the same day. This inability to maintain a working inventory of fulminating material slurry greatly complicates the large scale manufacture of percussive-type photoflash lamps. In addition, it has also been found that on some occasions fresh fulminating material does not meet the usual standards of sensitivity because the container of phosphorous from which it was made had been deactivated by atmospheric moisture.

In view of the foregoing, one of the principal objects of this invention is to provide a fulminating material for percussive-type photoflash lamps that has greatly improved stability when in the fluid state.

Another object is to provide a fulminating material that is both highly sensitive when dry and which maintains this high sensitivity during use conditions better than any fulminating material heretofore available.

These and other objects, advantages and features are obtained, in accordance with the principles of this invention, by the addition of a small quantity of sulfur to the red phosphorous.

In the accompanying drawing, the figure is an elevational view partly in section of a percussive-type photoflash lamp.

In the specific embodiment of the invention illustrated in the accompanying drawing, the percussive-type photoflash lamp illustrated therein comprises a length of glass tubing defining a hermetically sealed lamp envelope 2 constricted at one end to define an exhaust tip 4 and shaped to define a press 6 at the other end thereof. A primer 8 is sealed in the press 6. The primer 8 comprises a metal tube 10, a wire 12 and a charge of fulminating material 14.

The end of the tube 10 located outside the lamp envelope 2 is closed whereas the other end is open. The wire 12 is supported within the tube 10 by a crimp 16 near the outside end thereof. The charge of fulminating material 14 is located on that segment of the wire 12 which is located in the exposed segment of the tube 10. A combustible such as filamentary zirconium 18 and a combustion-supporting gas such as oxygen are disposed within the lamp envelope 2.

By way of specific example, a satisfactory fulminating material for use in percussive-type photoflash lamps in accordance with the principles of this invention may have the following dried compositions: boron 21.17%, zirconium 19.53%, stabilized red phosphorous 28.63%, sulfur 0.03%, potassium chlorate 28.63%, magnesium oxide 0.27% and hydroxyethyl cellulose 1.74%. The materials are mixed with sufficient distilled water to give a slurry of the desired consistency.

From the foregoing specific example, it will be noted that the quantity of sulfur required to be effective is not great. For example, in one test, two batches of fulminating material slurry were prepared according to the foregoing formulation, except that one batch contained no sulfur and the other contained sulfur to the extent of only 0.1% by weight of the phosphorous used. After standing at room temperature for two weeks, the material without sulfur was strongly acidic. The other batch, which differed only in that it contained a trace of sulfur, remained neutral. Both impact sensitivity measurements on the fulminating material and lamp reliability tests have vertified that the sulfur-containing material is not only more stable but is somewhat more sensitive toward impact. While this phenomenon is not completely understood, it is believed that the sulfur combines with the traces of copper present to form very inert and insoluble copper sulfides. This removal of essentially all of the oxidation-promoting copper is therefore at least partly responsible for the greatly improved performance observed.

Thus sulfur is extremely effective at low concentrations and it is believed it could conceivably be useful at values as small as 0.0005%. The use of relatively large amounts of sulfur, up to about 5% for example, produces some reduction in the impact sensitivity of the mixtures. However, I prefer to use about 0.03%, which is apparently a large excess over the effective minimum amount but which does not adversely affect impact sensitivity. To use substantially less, however, introduces practical problems associated with weighing and homogeneously blending in such small quantities.

The sulfur may be incorporated in the form of sulfides of metals or other elements as well as in the elemental state. For example, zinc sulfide or phosphorous sulfide could be used without departing from the spirit of this invention. However, no significant advantage appears to accrue from the use of such materials instead of elemental sulfur.

In any case, the use of minute quantities of sulfur or sulfides, particularly in the fractional percentage range, greatly improves the stabilization or shelf life as well as the impact sensitivity retention of red phosphorous-based fulminating materials for percussive-type photoflash lamps. Although this invention is especially significant with respect to water-based fulminating materials, its utility is not limited thereto.

It will be readily appreciated by those skilled in the art that substantial variations may be made in the composition of the fulminating material as detailed in the foregoing specific example without departing from the spirit of this invention. For example, the boron and zirconium together may comprise from about 10% to about 90% by weight of the dried composition. Their primary function is to transport combustion from the fulminating material to the shredded combustible. Although the use of a mixture of boron and zirconium is preferred, either of these materials may be used alone. The phosphorous and potassium chlorate may be present in weight ratios of from about 0.3 to 3.0; however a ratio of 1.0 is preferred. The overall content of phosphorous and potassium chlorate may vary from about 10% to about 90% of the total mixture. At the lower range, ignition sensitivity is not so good, and at the upper limit intolerable violance of deflagration is approached. Magnesium oxide is added to maintain the material slightly alkaline and may be present to the extent of about 0.1% to about 5.0%. The hydroxyethyl cellulose serves as a binder and may also vary from about 0.1% to about 5.0%.

What I claim is:
1. A photoflash lamp comprising:
   an hermetically sealed, light-transmitting envelope;
   a quantity of filamentary combustible material located within said envelope;
   a combustion-supporting gas in said envelope;
   and a primer secured to and extending from one end of said envelope and in communication therewith, said primer including a charge of red phosphorous-based fulminating material and a small quantity of sulfur insufficient to substantially affect the burning characteristics of said red phosphorous-based fulminating material.
2. The combination of claim 1 in which the quantity of sulfur present is in the fractional percentage range.
3. The combination of claim 1 in which the quantity of sulfur present is about 0.03% of the total weight of the dried composition of the fulminating material.
4. The combination of claim 1 in which the charge of red phosphorous-based fulminating material includes potassium chlorate, a metallic fuel and a resin binder.
5. The combination of claim 1 in which the charge of red phosphorous-based fulminating material includes potassium chlorate, a metallic fuel and a resin binder, and the quantity of sulfur present is in the fractional percentage range.
6. The combination of claim 1 in which the charge of red phosphorous-based fulminating material includes potassium chlorate, a metallic fuel and a resin binder, and the quantity of sulfur present is about 0.03% of the total weight of the dried composition of the fulminating material.
7. The combination of claim 1 in which said sulfur is in the elemental state.
8. The combination of claim 1 in which said sulfur is in the form of a sulfide.

References Cited
UNITED STATES PATENTS

| | | | |
|---|---|---|---|
| 2,194,480 | 3/1940 | Pritham | 149—30 X |
| 2,280,598 | 4/1942 | Merdith | 431—95 |

FOREIGN PATENTS

| | | |
|---|---|---|
| 431,953 | 7/1935 | Great Britain. |

EDWARD J. MICHAEL, Primary Examiner

U.S. Cl. X.R.
149—22; 30